3,121,706
POLYMERIZATION CATALYST MIXTURE OF A SELENIUM COMPOUND, A TITANIUM SALT, AND A LEWIS ACID
Darrell C. Feay, Berkeley, James C. Mackey, Concord, and Joseph B. Byrne, Antioch, Calif., assignors to The Dow Chemical Company, Midland, Mich., a corporation of Delaware
No Drawing. Filed Dec. 11, 1961, Ser. No. 158,551
10 Claims. (Cl. 260—94.9)

This invention relates to a new catalyst composition for initiating and promoting polymerization of ethylenically unsaturated monomers. It particularly concerns a new catalytically active mixture of a selenium compound, a titanium salt, and a Lewis acid.

It is known from Belgian Patents 533,362 and 538,782 to polymerize ethylene and higher olefins with catalytically active mixtures of a compound of a transition metal from groups IV, V, and VI of the periodic arrangement of the elements, i.e., titanium, zirconium, hafnium, vanadium, niobium, tantalum, chromium, molybdenum, tungsten, thorium, and uranium, such as titanium tetrachloride, and an organoaluminum compound such as triethylaluminum. Catalysts of such kind, although perhaps catalytically active, are disadvantageous in use because the organoaluminum compounds are hazardous in that they are generally incendiary and corrosive to human flesh and are unstable in that they are easily deteriorated by moisture, air, carbon dioxide, and many other commonly encountered impurities.

It is, therefore, an object of this invention to provide an improved and novel catalyst useful in polymerization of ethylenically unsaturated monomers.

It is a further object to provide a process for producing high molecular weight solid polymers from ethylenically unsaturated monomers.

This invention resides in the finding of a particular advantageous catalyst system that is beneficial in polymerizing a mono- or poly-ethylenically unsaturated monomer, which catalyst system comprises (1) at least one selenium compound of the formula $R_2Se$ wherein each R is a monovalent hydrocarbon, alkyl, cycloalkyl or aryl radical, (2) at least one titanium salt of the type $TiX_4$ and $Ti(OR)_4$ wherein X is a halide and R is as defined above; and, (3) at least one organoaluminum compound of the formula $RAlX_2$ wherein R and X are above-identified.

The particular improvement provided by and inherent in the catalyst system of the invention comes through the relative ease of handling the components that make up the catalyst in addition to the ability to employ lower temperatures and pressures than are necessary with many of the prior known catalysts. For instance, with the instant catalyst, room temperature and atmospheric pressure are often entirely satisfactory. In this respect, it is significant in the understanding of the invention to know that no combination of any two of the three components of the catalyst of the invention is active as a polymerization promoter at room temperature or as active as the present three-component catalyst.

The selenium compounds of the formula $R_2Se$ employed in the invention are of the type wherein each of the hydrocarbon radicals R is independently a 1 to 20, advantageously 1 to 10, carbon atom alkyl, cycloalkyl or aromatic radical. In a given compound the radicals R may be the same or different. Exemplary of these radicals are methyl, ethyl, isopropyl, hexyl, octadecyl, cyclohexyl, phenyl, benzyl, tolyl, etc. Exemplary of some of the selenium compounds that are within the scope of the present invention are $(i-C_4H_9)_2Se$, $(C_6H_5)_2Se$, $(C_3H_7)(C_6H_5)Se$, etc. A single one or a mixture of two or more of the selenium compounds can be used in compounding the catalysts of this invention.

The titanium salt that is admixed with one of the selenides described above is preferably an anhydrous salt and, as indicated, is of the type $TiX_4$ and $Ti(OR)_4$. Preferably, $TiCl_4$ is employed but other of the titanium tetrahalides are used with advantage, e.g., $TiBr_4$ and $TiI_4$. Of the titanium tetraalkoxides, $Ti(OC_4H_9)_4$ is particularly beneficial. A mixture of titanium salts may be used.

The third component in the catalyst system is a Lewis acid of the type of a mono-hydrocarbon aluminum dihalide wherein the hydrocarbon is a monovalent radical of a 1 to 20, preferably 1 to 10, carbon atom alkyl, cycloalkyl or aryl radical. The chlorides and bromides of the hydrocarbon aluminum dihalides, i.e., $RAlCl_2$ and $RAlBr_2$, are preferred in the present three-component catalysts system. Illustrative of some of these are $C_2H_5AlCl_2$, $i-C_4H_9AlCl_2$, $C_6H_5AlBr_2$, etc. A mixture of $RAlX_2$ compounds may be used.

The catalyst compositions of this invention are those which comprise at least appreciable proportions of each of the selenium compound, the titanium salt, and the Lewis acid as specified.

Ordinarily, and preferably, about equimolar quantities of the selenium compound and the titanium salt are employed in the catalyst system with the molar quantity of the Lewis acid being about 4 times that of either the selenium compound or the titanium salt. However, the molar ratio of selenium compound to titanium salt can conveniently range from about 1:1 to about 10:1 while the molar ratio of the Lewis acid to titanium salt conveniently ranges from about 1:1 to about 10:1.

Depending somewhat on the monomer(s) being polymerized, generally only a small amount of catalyst is necessary to assure the activating effect. On the order of 0.1 to 10 and preferably 0.1 to 5 weight percent of catalyst based on the weight of the polymerizing monomer is conveniently employed in the practice of the invention.

The monomers that are beneficially polymerized with the catalysts of the invention may be broadly defined as ethylenically unsaturated monomers, including both mono- and poly-ethylenically unsaturated monomers. Those monomers of the aliphatic and cyclic olefin class containing 2 to 8 carbon atoms, including both mono- and di-olefins, such as ethylene, propylene, butylene, and butadiene (including polymerizable mixtures thereof) and particularly 1-olefins or α-olefins, which are so-designated because of their terminal unsaturation, are beneficially polymerized in accordance with the invention. Examples of other polymerizable monomers that can be polymerized in accordance with the invention are the aryl olefins, particularly styrene and alkyl-substituted styrenes such as methyl styrene. Other monomers that may be polymerized by and are exemplary of the versatility of the present catalysts are vinyl chloride, acrylonitrile, methyl acrylate, etc.

The polymerizations carried out with the present catalysts are preferably performed in the presence of an anhydrous inert hydrocarbon solvent (or gas) under pressure sufficient to maintain a liquid phase during the polymerization. In this manner, a mixed phase is usually prevalent since the catalyst is usually dispersed slurry-like throughout the solvent. Care should be taken that the solvent is free of oxygen and sulfur containing compounds which tend to deactivate the catalyst. Among the hydrocarbon solvents or diluents that can be used in the polymerization process with the instant catalysts are the alkanes such as propane, butane, pentane, isooctane, etc.; the cycloalkanes such as cyclohexane; and the aromatics such as benzene, toluene and xylene. The exact choice of the diluent will, of course, depend on the particular species of catalyst, the monomer(s) being polymerized and the particular operating conditions.

As indicated, the instant catalysts can suitably enhance polymerization at room temperature and atmospheric pressure. However, increasing the temperature or the pressure generally provides an increased rate of polymerization. Temperatures from about room temperature and below up to about 250° C. and higher can be employed. The preferred range is from about 20° to 80° C. Similarly, a rather broad range of pressure may be employed for the polymerization. For example, from atmospheric pressure and below up to any feasibly attainable pressure, e.g., 25,000 p.s.i. can be beneficially adapted. A more desirable range is from atmospheric to 100 p.s.i. or so. Again, the particular operating conditions will be in part determined by the catalyst-monomer system.

When the catalysts of the present invention are utilized, generally either the selenium compound or the titanium salt component of the catalyst is first dissolved or dispersed in a desired solvent after which the other component is added. The Lewis acid is usually, but not necessarily, added last. Preferably the first two catalyst components, in the solvent, are added to the polymerization reactor after which the monomer to be polymerized is added and then the Lewis acid is added to complete the catalyst composition and to initiate the polymerization. Other procedures are also satisfactory, such as adding the Lewis acid to the reactor containing the other two components and then pressuring the reactor with the polymerizable monomer. In any event, care should be taken to flush the reactor, and keep it free, of impurities that tend to deactivate the catalyst, as indicated, the primary offenders being oxygen- and sulfur-containing compounds, including water.

After the termination of polymerization, or when and if it is desired to stop the polymerization, the catalyst is deactivated by quenching with, for instance, alcohol or acetone, killing the reaction. The polymer is then recovered from the mixture by known means such as filtration and the catalyst is removed from the polymer by known methods.

The following examples are given to illustrate the invention wherein all parts and percentages are by weight unless otherwise specified.

*Example 1*

A catalyst composition was prepared as follows. One liter of xylene containing 2.33 grams of $(C_6H_5)_2Se$ was placed in a stainless steel pressure reactor after which the reactor was purged with nitrogen. Then 1.9 g. of $TiCl_4$ and 7.04 g. of $(i-C_4H_9)AlCl_2$ were added to the reactor to produce a catalyst composition. The catalyst composition was used to initiate and promote the polymerization of ethylene as described below.

After purging with ethylene, the reactor was pressured to 50 p.s.i.g. with ethylene. Polymerization of the ethylene was allowed to proceed for three hours at 70° C. and then stopped by quenching with acetone. The polymerization slurry was filtered and the polymer was recovered, washed with hot acetonic-HCl solution, rinsed with acetone and dried. One-hundred-five grams of white polymer were obtained. The polymer was 57 percent crystalline as determined by X-ray diffraction technique. Infrared analysis on a film flash moulded from the polymer indicated no unsaturation in the polymer. The crystalline melting point of the polymer was 119.3°–119.5° C. This was determined with a polarizing microscope equipped with a hot stage. The nominal molecular weight, reduced viscosity and inherent viscosity were determined from solution of the polymer in decahydronaphthalene at a concentration of 0.02 g. polymer/100 ml. at 135° C. These were: nominal M.W. 26,000; reduced viscosity 1.00; inherent viscosity 0.99.

In contrast, when the foregoing was repeated excepting to eliminate the $(C_6H_5)_2Se$, only 19 grams of polyethylene were made in four hours. This poymer was 62 percent crystalline, had a melting point of 118–121° C., a nominal M.W. of 37,000, a reduced viscosity of 1.25 and an inherent viscosity of 1.235 (0.02 g. polymer/100 ml. decahydronaphthalene at 135° C.).

*Example 2*

One millimole of $(C_6H_5)_2Se$ was dissolved in 10 ml. of toluene under nitrogen. One millimole of $Ti(OC_4H_9)_4$ was added to this solution and an orange solution plus a red-brown liquid second phase formed. This system was added to a glass reactor containing 90 ml. of n-heptane and 4 millimoles of $(C_2H_5)AlCl_2$ to provide a catalytically active system. The reactor was purged with ethylene to atmospheric pressure and filled with ethylene at room temperature. After 24 hours, methanol was added to the polymerization slurry to stop the reaction and the slurry was filtered. The polymer was treated with dilute aqueous HCl, rinsed with acetone and dried. About 1.2 grams of dry white polyethylene were recovered which was insoluble in decahydronaphthalene at 135° C. indicating a nominal molecular weight in excess of 750,000.

When, for purposes of contrast, the procedure of Example 2 was repeated excepting to eliminate the selenide and using one millimole of $TiCl_4$ and 4 millimoles of $(C_2H_5)AlCl_2$, only 0.3 gram of polymer was recovered after 24 hours of polymerization.

What is claimed is:

1. A catalyst composition consisting essentially of (1) at least one selenium compound of the formula $R_2Se$ wherein each R is a 1 to 20 carbon atom monovalent hydrocarbon radical selected from the group consisting of alkyl, cycloalkyl and aryl radicals; (2) at least one titanium salt selected from those having the formulae $TiX_4$ and $Ti(OR)_4$ wherein X is a halide and each R is as above-identified; and (3) a compound of the formula $RAlX_2$ wherein R and X are as above-identified.

2. A catalyst composition consisting essentially of diphenyl selenide, titanium tetrachloride and isobutyl aluminum dichloride.

3. A catalyst composition consisting essentially of diphenyl selenide, titanium tetrabutoxide, and ethyl aluminum dichloride.

4. A catalyst composition consisting essentially of (1) from about 10 to 30 mole percent of a selenium compound of the formula $R_2Se$ wherein each R is a 1 to 20 carbon atom monovalent hydrocarbon radical selected from the group consisting of alkyl, cycloalkyl and aryl radicals; (2) from about 10 to 30 mole percent of a titanium salt selected from those having the formulae $TiX_4$ and $Ti(OR)_4$ wherein X is a halide and R is as above-identified; and, (3) from about 80 to 40 mole percent of a compound of the formula $RAlX_2$ wherein R and X are as above-identified.

5. A catalyst composition consisting essentially of from about 10 to 30 mole percent diphenyl selenide, from about 10 to 30 mole percent titanium tetrachloride, and from about 80 to 40 mole percent isobutyl aluminum dichloride.

6. A catalyst composition consisting essentially of from about 10 to 30 mole percent diphenyl selenide, from about 10 to 30 mole percent titanium tetrabutoxide, and from about 80 to 40 mole percent ethyl aluminum dichloride.

7. A method for polymerizing an ethylenically unsaturated monomer by contacting said monomer with a catalyst consisting essentially of (1) a selenium compound of the formula $R_2Se$ wherein each R and is a 1 to 20 carbon atom monovalent hydrocarbon radical selected from the group consisting of alkyl, cycloalkyl and aryl radicals; (2) a titanium salt selected from those having the formulae $TiX_4$ and $Ti(OR)_4$ wherein X is a halide and each R is as above-identified; and, (3) a compound of the formula $RAlX_2$ wherein R and X are as above-identified.

8. The method of claim 7, wherein said catalyst consists essentially of diphenyl selenide, titanium tetrachloride and isobutyl aluminum dichloride.

9. The method of claim 7, wherein said catalyst consists essentially of diphenyl selenide, titanium tetrabutoxide and ethyl aluminum dichloride.

10. The method of claim 7, wherein said monomer is an α-ethylenically unsaturated monomer containing from 2 to 8 carbon atoms.

References Cited in the file of this patent

FOREIGN PATENTS 553,839   Belgium _____ June 29, 1956